April 27, 1965   N. W. THOMPSON   3,180,131
CALIBRATING AND TESTING CENTRIFUGE
Filed Dec. 4, 1961   4 Sheets-Sheet 1

INVENTOR.
Norman W. Thompson
BY
Moses, Nolte & Nolte
ATTORNEYS

April 27, 1965 N. W. THOMPSON 3,180,131
CALIBRATING AND TESTING CENTRIFUGE
Filed Dec. 4, 1961 4 Sheets-Sheet 2

April 27, 1965   N. W. THOMPSON   3,180,131
CALIBRATING AND TESTING CENTRIFUGE
Filed Dec. 4, 1961   4 Sheets-Sheet 3

INVENTOR
Norman W. Thompson
BY
Moses, Nolte + Nolte
ATTORNEYS

April 27, 1965 N. W. THOMPSON 3,180,131
CALIBRATING AND TESTING CENTRIFUGE
Filed Dec. 4, 1961 4 Sheets-Sheet 4

INVENTOR
Norman W. Thompson
BY
Moses, Nolte & Nolte
ATTORNEYS ized Apr. 27, 1965

3,180,131
CALIBRATING AND TESTING CENTRIFUGE
Norman W. Thompson, Remsen Road,
Wading River, N.Y.
Filed Dec. 4, 1961, Ser. No. 156,712
8 Claims. (Cl. 73—1)

This invention relates to a centrifuge, particularly to a centrifuge used for the calibration and testing of devices under acceleration conditions.

In the known types of testing centrifuges, the object to be tested is fastened to a rotatable arm at a calculated distance from the center of rotation. The centrifugal acceleration then can be determined from the radial distance and the speed of rotation. When a change in acceleration is required, a corresponding change in motor speed has to be provided, or alternately the machine has to be stopped and the object to be tested has to be fastened to another calculated distance from the center of rotation. Both of the above-mentioned methods involve delay and calculation.

The object of this invention is to provide a calibrating and testing centrifuge wherein the location of the object to be tested can be adjusted to provide larger and smaller acceleration in small increments, to the object to be tested, without stopping the machine.

Another object of the invention is to provide means by which a direct reading about the object to be tested can be obtained during operation.

Another object of the invention is to greatly reduce the time and effort involved in the acceleration testing of items.

Another object of the invention is to make it possible to analyze performance characteristics of an accelerometer in a way not possible previously, permitting a testing of the accelerometer under more realistic conditions than possible heretofore.

The word "accelerometer" as used in the description and the claims is a term of convenience, and it is to be understood that this descriptive word also refers to any and other objects whose operational characteristics can be tested on the centrifuge of the present invention.

Other objects and advantages of the device of the present invention will become apparent from the following detailed description and the appended drawings, wherein.

Figure 1:
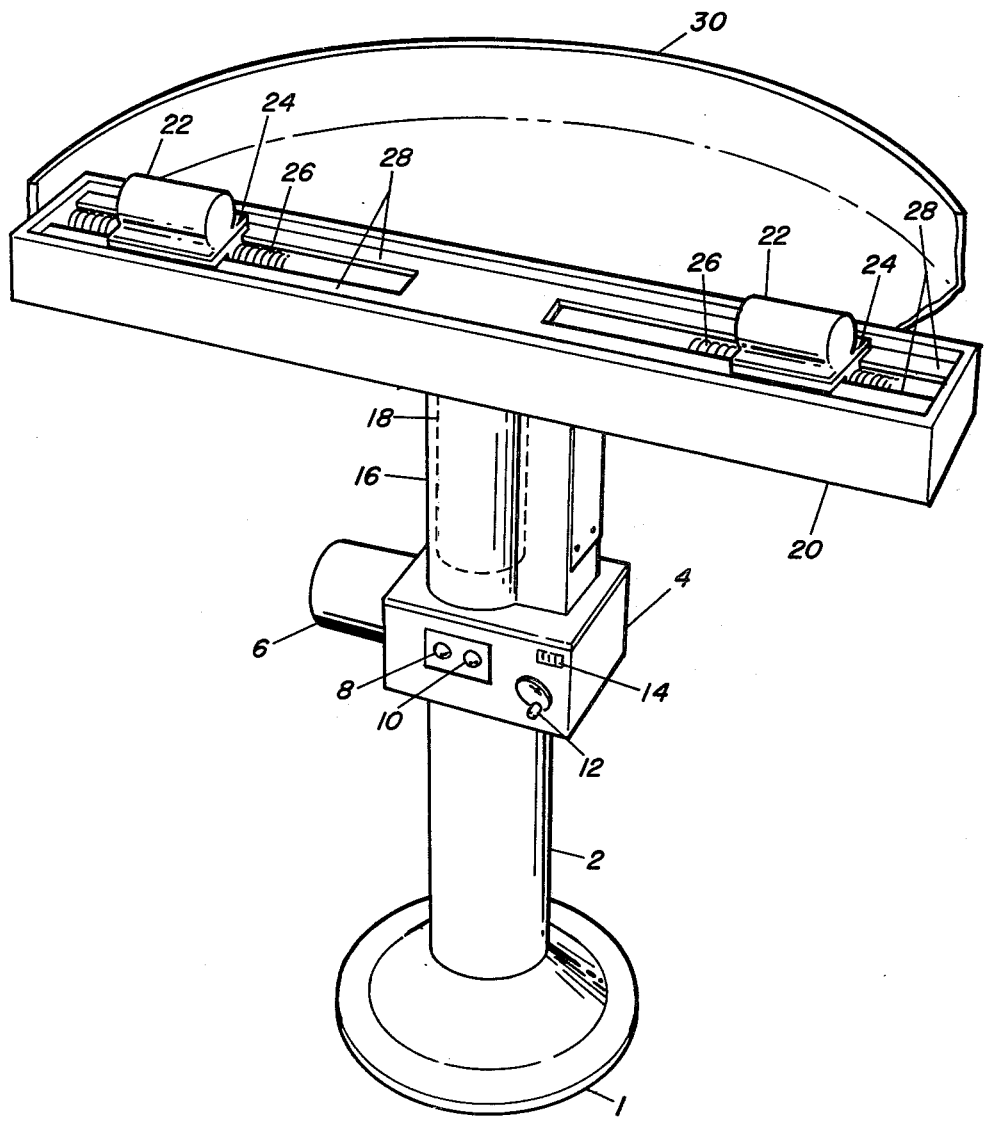
FIG. 1 shows a principal perspective view of the centrifuge.

FIG. 1 shows the centrifuge of the present invention in its simplest embodiment. The device rests on a base 1. A column 2 at its lower end is attached to the base 1 and a control mechanism 4 is located at the upper end thereof. The column 2 is of a length, making observation and handling of the control mechanism 4 convenient. The control mechanism 4 includes a motor 6, On, Off switches 8 and 10, a position-adjusting hand wheel 12 and counter 14. The driven spindle 18 is surrounded by protective cover 16. The driven spindle 18 transmits its rotation to the centrifuge arms 20. The sample 22 to be tested is fastened to a sample holder 24 by any convenient means.

The sample holder 24 has a threaded bore 25 (FIG. 2) engaged by threaded rod 26. The sample holder 24, as positioned by threaded rod 26, slides on shoulders 28 of centrifuge arm 20. The centrifuge arms can be surrounded by a protective fence 30.

Figure 2:
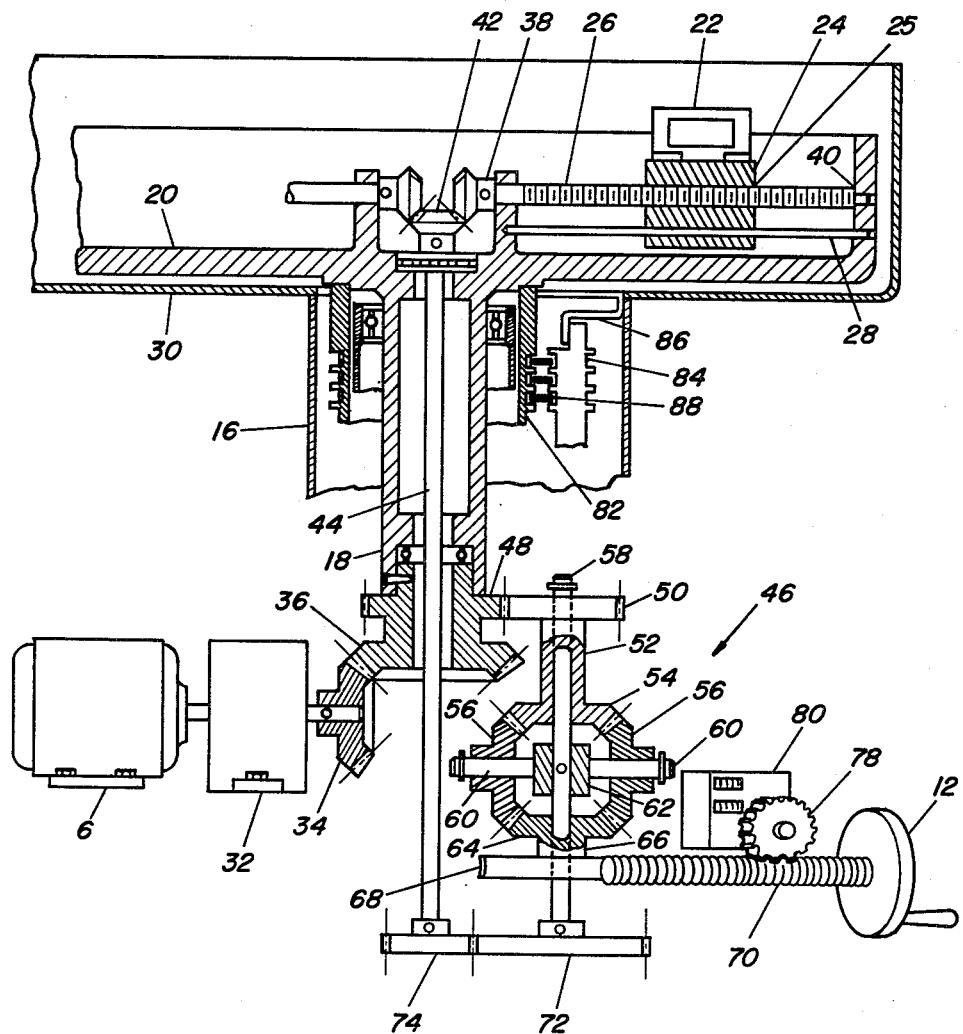
FIG. 2 shows an operational sectional view of the centrifuge.

The mode of operation of the device in its simplest form is explained by reference to FIG. 2. Protective fence 30 is shown integrally connected to protective cover 16 of driven spindle 18. The motor 6 is connected to a gear box 32. If desired, gear box 32 can be a variable speed drive. Bevel gear 34 is connected to gear box 32 and meshes with bevel gear 36. Bevel gear 36 is connected to driven spindle 18 which, in turn, is integral with centrifuge arms 20. Threaded rods 26 of each centrifuge arm 20 have a driven positioning-bevel-gear 38 attached to their inside ends. The outer ends of the threaded rods 26 are journaled at 40 into the respective centrifuge arms. Positioning bevel gears 38 mesh with driving positioning bevel gear 42. Gear 42 is firmly attached to shaft 44 which is concentric with spindle 18.

Motor 6 causes centrifuge arms 20 to rotate, by transmitting the torque through gear box 32, bevel gears 34 and 36 and spindle 18. It can be visualized that if shaft 44 and driving positioning bevel gear 42 would be stationary, the rotation of bevel gears 38 would cause threaded rod 26 to rotate and move sample holders 24 with samples 22 to one extremity of centrifuge arms 20. To avoid this, and also to allow selective positioning of sample 22 and sample holder 24, a position maintaining and changing mechanism 46 is provided.

In the following, the position maintaining and changing mechanism 46 is described. Bevel gear 36 is integral with a spur gear 48. Spur gear 48 meshes with spur gear portion 50 of spur-bevel-gear-cluster 52. The number of teeth on spur gear 48 and spur gear portion 50 are identical, therefore, spur-bevel-gear-cluster 52 rotates at the same speed as spindle 18. Planetary bevel gears 56 mesh with the bevel gear portion 54 of spur-bevel-gear-cluster 52, which is freely rotatably mounted on shaft 58. Planetary bevel gears 56 are rotatably journaled to shafts 60, which shafts, at their inner ends, are radially fixed in block 62. Block 62 is firmly attached to shaft 58. Planetary bevel gears 56 mesh with the bevel gear portion 64 of worm-bevel-gear-cluster 66 having a worm-gear portion 68. Worm-bevel-gear-cluster 66 is held stationary by worm 70 and planetary bevel gears 56 circle around it as driven by spur-bevel-gear cluster 52. Shaft 58 is also rotatably disposed within worm-bevel-gear-cluster 66. As planetary gears 56 of the above-described differential system rotate, they impart rotation to shaft 58. The speed of rotation of shaft 58 will be one-half of the speed of rotation of spur gear 48 and spur gear portion 50 of spur-bevel-gear-cluster 52. Gear 72 is firmly attached to shaft 58 for rotation therewith. Gear 72 meshes with gear 74 which has half the amount of teeth than the number of teeth on gear 72 and therefore, its speed of rotation will be double the speed of rotation of gear 72. The lower end of shaft 44 is firmly attached for rotation with gear 74, and therefore, driving positioning bevel gear 42 will have the same speed of rotation and same sense of direction as spur gear 48 and centrifuge arms 20. Consequently, samples 22 and sample holders 24 will stay at a requisite distance from the center of rotation of centrifuge arms 20.

If it is desired to change the location of sample 22 and sample holder 24 along the length of centrifuge arm 20, depending on, into which direction the motion of sample and sample holder is intended, additional or fewer turns are imparted to planetary gears 56. This can be accomplished by rotating worm-bevel-gear-cluster 66 in clockwise or counter-clockwise direction. This is accomplished by rotating hand wheel 12 which is firmly attached to worm 70 and meshing with worm gear portion 68 of worm-bevel-gear-cluster 66. In this case, a relative radial positioning is established between centrifuge arm 20 and sample holder 24, consequently sample 22 and sample holder 24 will change their position relative to the center of rotation along centrifuge arm 20. A worm gear 78 meshes with worm 70. This worm gear is coupled to a mechanical counter system 80, permitting a direct indication of the radial position of the sample holder and the sample to be tested.

The centrifugal force acting on the accelerometer's seismic mass can be obtained in accordance with the following formula:

$$F = \frac{S}{g} R \omega^2$$

where:

$F$ = centrifugal force (in pounds)
$S$ = weight of accelerometer's seismic mass
$g$ = 32.2 (approximately)
$R$ = radius of rotation in feet (seismic mass)
$\omega = 2\pi N$
$N$ = revolutions of shaft per second In order to establish electrical connections between the rotating sample 22 and the stationary part of the centrifuge, slip rings 82 are provided. The slip rings are firmly attached to the centrifuge arms 20 and rotated therewith. The outside leads of the electrical connections are attached to terminal strip 84 which is supported by bracket 86 from the stationary protective fence 30. Commutator brushes 88 are urged by springs (not shown) against the slip rings 82, thus establishing a rotary electrical connection between rotating slip rings 82 and stationary terminal strip 84. The slip ring assembly is located within cover 16.

A working model of the centrifuge has been designed for a speed of two revolutions per second. The arms 20 are of a 2 foot radius and this permits obtaining up to 10 gravity units. With a higher speed of rotation the same G number could be obtained with a shorter arm. Therefore, gear box 32, as already mentioned, is preferably of the variable speed type, which allows increasing or decreasing the speed of rotation of centrifuge arms 20.

Another feature of the invention, as to be described, permits the simulation of conditions, where an accelerometer or a similar directionally-sensitive device can be subjected to a quickly applied accelerating force of a given magnitude. In the description of this feature, reference is made to FIGS. 3 and 4.

Figure 3:
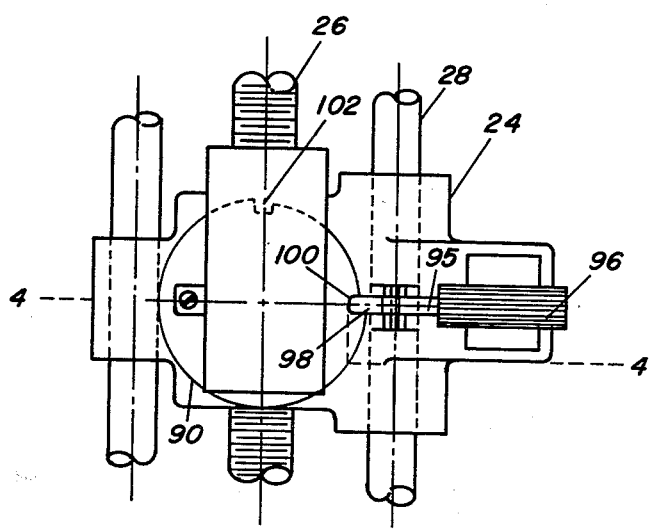
FIG. 3 shows a special embodiment of the sample holder.
Figure 5:
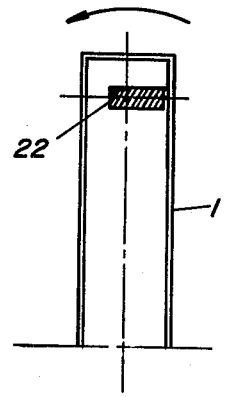
FIG. 5 shows one position of the accelerometer to be tested, in relation to the centrifuge.
Figure 4:
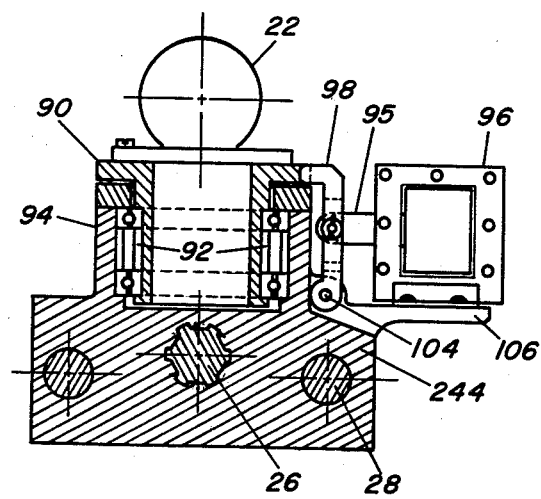
FIG. 4 is a sectional-elevational view taken along line 4—4 of FIG. 3.

In FIGS. 3 and 4, a rotatable body 90 is journaled by bearings 92 to the upper portion 94 of sample holder 244. In this case, sample 22 to be tested is attached by any suitable means (not shown) to the rotatable portion 90. A solenoid armature 95 at its one end can be activated by solenoid 96 and at its other end is attached to detent arm 98. Recesses 100 and 102 are provided in the rotating member 90, the recesses are corresponding in size to detent arm 98. The lower portion of the detent arm 98 is pivoted at 104 to the stationary extension 106 of supporting member 244. The mass of rotatable member 90 is eccentric with regard to its vertical axis. When the operation of the centrifuge is started, the accelerometer is in the position as shown in FIG. 5. The centrifugal force incident to the rotation of centrifuge arm 20 is not sensed by the accelerometer, because the centrifugal force acts in a direction perpendicular to the sensitive direction of the accelerometer.

Figure 6:
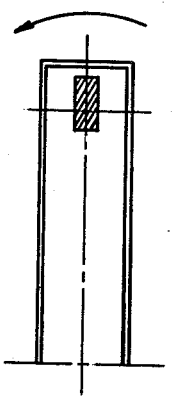
FIG. 6 shows another position of the accelerometer to be tested, in relation to the centrifuge.

Whenever desired, power is applied to the solenoid 96 through slip rings 82, whereby the armature 95 and detent arm 98 coupled thereto is drawn back from recess 100. The rotary member 90 then becomes free for rotation and due to its above-mentioned eccentricity, the attached accelerometer assumes the position shown in FIG. 6. This motion is a 90° rotation and it can be brought to a fixed position by suitable detent means (not shown). Thus, the purpose of exposing the accelerometer to a quick force is accomplished, because it will become exposed to the centrifugal force corresponding to its speed and position now acting along its sensing direction. Various electrical measurements required in this testing operation can also be accomplished through the slip rings 82.

In the process of calibrating and testing items under acceleration conditions, it is frequently required to vibrate the seismic mass of the item to be tested, while at the time it is being subjected to a constant centrifugal force. This can be accomplished by imparting a back-and-forth movement to worm 70 (FIG. 2).

Figure 7:
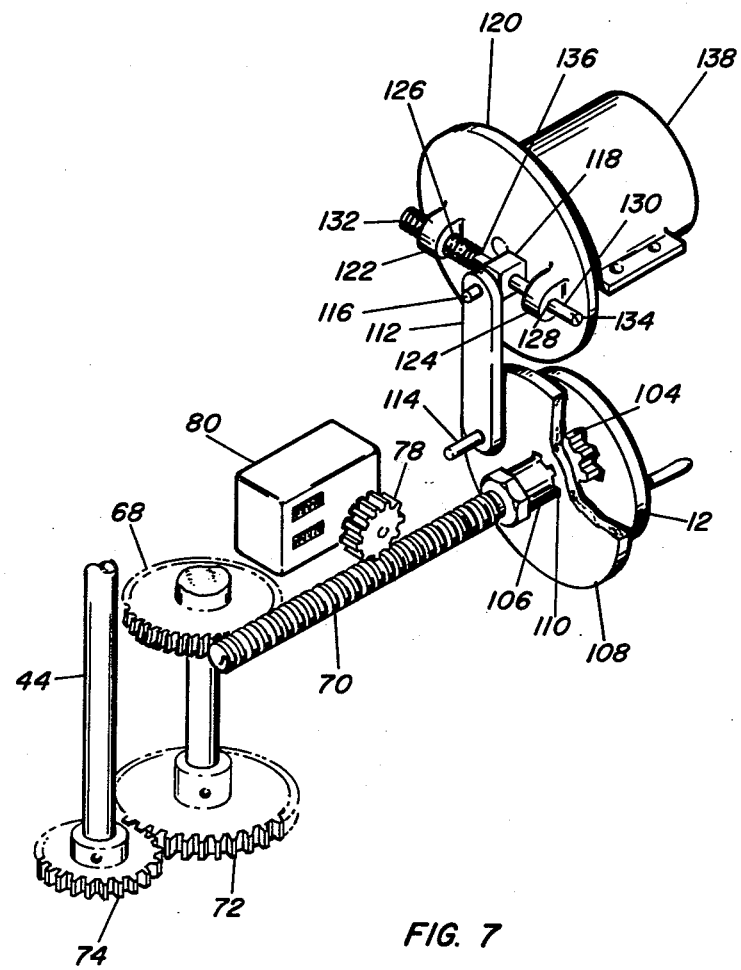
FIG. 7 shows a device whereby vibrational motion can be imparted to the sample to be tested.

A device adapted to impart such a movement is shown in FIG. 7. The hand wheel 12 is formed integral with a male spline 104 and sleeve 106. A disc 108 having a bore 110 is positioned concentrically around spline 104 and sleeve 106. The walls of bore 110 are gear-shaped and adapted to mesh with spline 104. The disc 108 can alternately be disengaged from said meshing position, in this case the gear-shaped bore 110 will ride over the sleeve 106. Thus, a selective coupling between worm 70 and disc 108 is accomplished. A link 112 is pivoted on pin 114, the latter being firmly attached to the periphery of disc 108. The other end of link 112 is pivoted on pin 116 which is firmly attached to sleeve member 118. Disc 120 is equipped with protruding portions 122 and 124, both protruding portions containing bores 126 and 128. Bore 126 is threaded while bore 128 is smooth. A shaft 130 is threaded at the end 132 and with a slot 134 at the other end thereof. The threaded portion of the shaft 130 passes through and engages the thread of bore 126 of protruding member 122, the smooth portion of shaft 130 passes through the smooth bore 128 of protruding member 124. The sleeve member 118 is rotatably mounted on shaft 130 between the inside end 136 of the threaded portion and the inside of protruding member 124 and is adapted to follow the axial movements of the shaft. The disc 120 on its other side has a hub (not shown) attached to the rotor shaft (not shown) of a variable speed electric motor 138.

Thus, when disc 120 is rotated by motor 138 at some preselected speed, link 112 will eccentrically drive disc 108 by forcing it to describe a back-and-forth motion, rotating worm 70 in the above-mentioned back-and-forth reciprocating manner. The eccentric location of sleeve member 118 with relation to the center of rotating disc 120 can be adjusted by rotating shaft 130 with the aid of slot 134. This way the amplitude of the vibration imparted to sample 22 on sample holder 24 can be varied. The oscillation thus imparted to the samples to be tested will approximate a sine wave form.

It is to be understood that minor changes can be made on the device of the present invention without departing from the scope of the claims.

What I claim is:

1. A testing centrifuge comprising at least one arm mounted for angular rotation, holding means being adjustable along the length of said arm, motor means for rotating said arm, positioning means to adjust said holding means along the length of said arm during the angular rotation of said arm, said positioning means including a threaded rod extending substantially along the length of said arm in threaded engagement with said holding means, and a differential system interengaged with said motor means for selectively imparting a rotation to said threaded rod to adjust said holding means along the length of said arm, said first and second coupling means comprising first and second gears in meshing engagement with each other; said location fixing means consisting of a differential system including a planetary gear system comprising a first planet drive gear coupled to said motor means, a plurality of planet gears being driven by said planet drive gear, and means coupled to said planet gears for driving said first and second gears; said location-altering means including a sun gear about which said planet gears orbit, and means for selectively rotating said sun gear.

2. A testing centrifuge according to claim 1 wherein a plurality of said arms are provided, each of said arms being disposed about said first axis at equal angular increments relative to each other.

3. A testing centrifuge according to claim 1, wherein said location altering means further includes a crank coupled to said sun gear.

4. A testing centrifuge according to claim 3, including a bi-directional counter coupled to said crank for indicating the relative position of said holding means along the length of said arm.

5. A testing centrifuge according to claim 1, wherein said location altering means is adapted to impart vibration to said holding means by intermittently altering its position along the length of said arm, said location altering means including a vibrator motor, and means coupling said vibrator motor to said sun gear for rotating the same in alternating directions.

6. A testing centrifuge according to claim 1, wherein said motor means includes a constant speed motor with fixed speed gearing means.

7. A testing centrifuge comprising an arm mounted for angular rotation, means for rotating said arm about a first axis, holding means adjustable along the length of said arm for holding the device to be tested, a threaded rod extending along the length of said arm and mounted therein for rotation about its own axis, said rod being in threaded engagement with said holding means, first coupling means mounted at the end of said rod, second coupling means engaging said first coupling means for rotating said rod, location fixing means for rotating said second coupling means with an angular velocity equal to the angular velocity of said arm to prevent said second coupling means from rotating in order to maintain a constant positioning of said holding means along the length of said arm, and location altering means for rotating said second coupling means relative to said arm to rotate said first coupling means, whereby said holding means may be repositioned along the length of said arm, said arm including an electric slip ring contact adjacent the rotational center of said arm for coupling an electrical lead to said holding means, and said holding means including a base portion in threaded engagement with said rod, a platform portion being journaled to said base portion for rotation thereon, and an electromagnetically controlled detent being selectively releasable by remote control through said slip ring contact for imparting a directional change to said platform portion during the angular rotation of said arm.

8. A testing centrifuge comprising a plurality of arms mounted for rotation from a central axis, each of said arms being disposed about said axis in equal angular increments relative to each other, motor means for rotating said arms, a plurality of holding means each being adjustable along the length of a corresponding arm and during rotation of said arm, a plurality of threaded rods each extending along the length of a corresponding arm and being mounted therein for rotation about their own axes, each of said rods being in threaded engagement with a corresponding holding means, a plurality of first gears, each being mounted at the end of a corresponding rod adjoining the rotational center of said arms, a second gear disposed in the rotational center of said arms and meshing with said first gears, a planet drive gear means adapted to be driven from said motor means, a plurality of planet gears in meshing engagement with said planet drive gear, means coupled to said planet gears for driving said first and second gears with said arm, a sun gear about which said planet gears orbit, means for rotating said sun gear, a bi-directional revolution counter coupled to said sun gear for indicating the relative position of said holding means along the length of said arms, a plurality of electric slip ring contacts adjacent the rotational center of said arms for coupling electrical leads to said holding means, said holding means each including a base portion in threaded engagement with a corresponding rod, a rotatable platform portion journaled to said base portion, and an electromagnetically controlled detent for selectively restraining said platform portion from rotation relative to said rotating arm, said detent being selectively releasable by remote control through said slip ring contacts for imparting a directional change to said platform portion during the angular rotation of said arms.

References Cited by the Examiner
UNITED STATES PATENTS

| | | | |
|---|---|---|---|
| 2,301,967 | 11/42 | Nosker et al. | 73—1 |
| 2,924,092 | 2/60 | Bourns et al. | 73—1 |
| 3,011,333 | 12/61 | Roth et al. | 73—1 |

ISAAC LISANN, *Primary Examiner.*